United States Patent
Liu et al.

(10) Patent No.: US 12,416,331 B2
(45) Date of Patent: Sep. 16, 2025

(54) THREE-DIMENSIONAL PARALLEL-TRIANGULAR-SHAPED GROOVE ARRAY SURFACE FOR BEARING AND FABRICATING METHOD THEREOF

(71) Applicant: Qingdao University of Technology, Shandong (CN)

(72) Inventors: Cheng Long Liu, Shandong (CN); Feng Guo, Shandong (CN); Bin Ju, Shandong (CN); Xin Ming Li, Shandong (CN); Qing Hua Bai, Shandong (CN); Shu Yi Li, Shandong (CN)

(73) Assignee: QINGDAO UNIVERSITY OF TECHNOLOGY, Shandong (CN)

( * ) Notice: Subject to any disclaimer, the term of this patent is extended or adjusted under 35 U.S.C. 154(b) by 0 days.

(21) Appl. No.: 18/245,914

(22) PCT Filed: May 18, 2022

(86) PCT No.: PCT/CN2022/093605
§ 371 (c)(1),
(2) Date: Mar. 20, 2023

(87) PCT Pub. No.: WO2023/097987
PCT Pub. Date: Jun. 8, 2023

(65) Prior Publication Data
US 2024/0352972 A1 Oct. 24, 2024

(30) Foreign Application Priority Data
Dec. 1, 2021 (CN) .......................... 202111450909.3

(51) Int. Cl.
*F16C 33/58* (2006.01)
*B23K 26/364* (2014.01)
(Continued)

(52) U.S. Cl.
CPC .......... *F16C 33/585* (2013.01); *B23K 26/364* (2015.10); *F16C 33/64* (2013.01);
(Continued)

(58) Field of Classification Search
CPC ...... F16C 33/1065; F16C 33/64; F16C 33/66; F16C 33/6614; F16C 33/6637;
(Continued)

(56) References Cited

U.S. PATENT DOCUMENTS 10,060,479 B2 * 8/2018 Ai ........................ F16C 33/6651
2014/0056547 A1 * 2/2014 Murata ................... F16C 19/50
384/101

(Continued)

FOREIGN PATENT DOCUMENTS

| CN | 112128228 A | * | 12/2020 | ............. C23C 16/26 |
| JP | 2006177467 A | * | 7/2006 | ............. F16C 19/163 |

(Continued)

*Primary Examiner* — Alan B Waits
(74) *Attorney, Agent, or Firm* — McClure, Qualey & Rodack, LLP

(57) ABSTRACT

A method for fabricating the three-dimensional comb-tooth-shaped groove array surface, the surface of the bearing is first etched with grooves having a certain depth by means of femtosecond lase, then a PTFE film is impressed and attached to the surface of the inner ring of the bearing, the position of a laser focus is adjusted to focus on the lower surface of the PTFE film, the same pit is scanned repeatedly, ripple characteristic stripes occur on the surface of the inner ring of the bearing while the film gasifies instantly under the action of laser ablation heating, a part of polymer material in the gasified part is adsorbed to a mechanical surface in each pit under the action of mechanical interlocking, and a super-oleophobic PTFE surface is obtained in each groove.

7 Claims, 6 Drawing Sheets

(51) Int. Cl.
  *F16C 33/64* (2006.01)
  *F16C 33/66* (2006.01)
(52) U.S. Cl.
  CPC .......... *F16C 33/66* (2013.01); *F16C 2208/32* (2013.01); *F16C 2223/30* (2013.01)
(58) Field of Classification Search
  CPC .............. F16C 33/6651; F16C 33/6696; F16C 2208/32; F16C 2223/30; B23K 26/364
  See application file for complete search history.

(56) References Cited

U.S. PATENT DOCUMENTS

2014/0079348 A1* 3/2014 Suzuki ................ F16C 33/6651
  384/463
2014/0079349 A1* 3/2014 Murata ............... F16C 33/6681
  384/475

FOREIGN PATENT DOCUMENTS

| | | | | | |
|---|---|---|---|---|---|
| JP | 2008223942 | A | * | 9/2008 | .............. F16C 33/62 |
| JP | 2009002436 | A | * | 1/2009 | ............ F16C 33/585 |
| JP | 2009108901 | A | * | 5/2009 | ............ F16C 33/585 |
| WO | WO-2020105187 | A1 | * | 5/2020 | .............. F16C 19/04 |

* cited by examiner

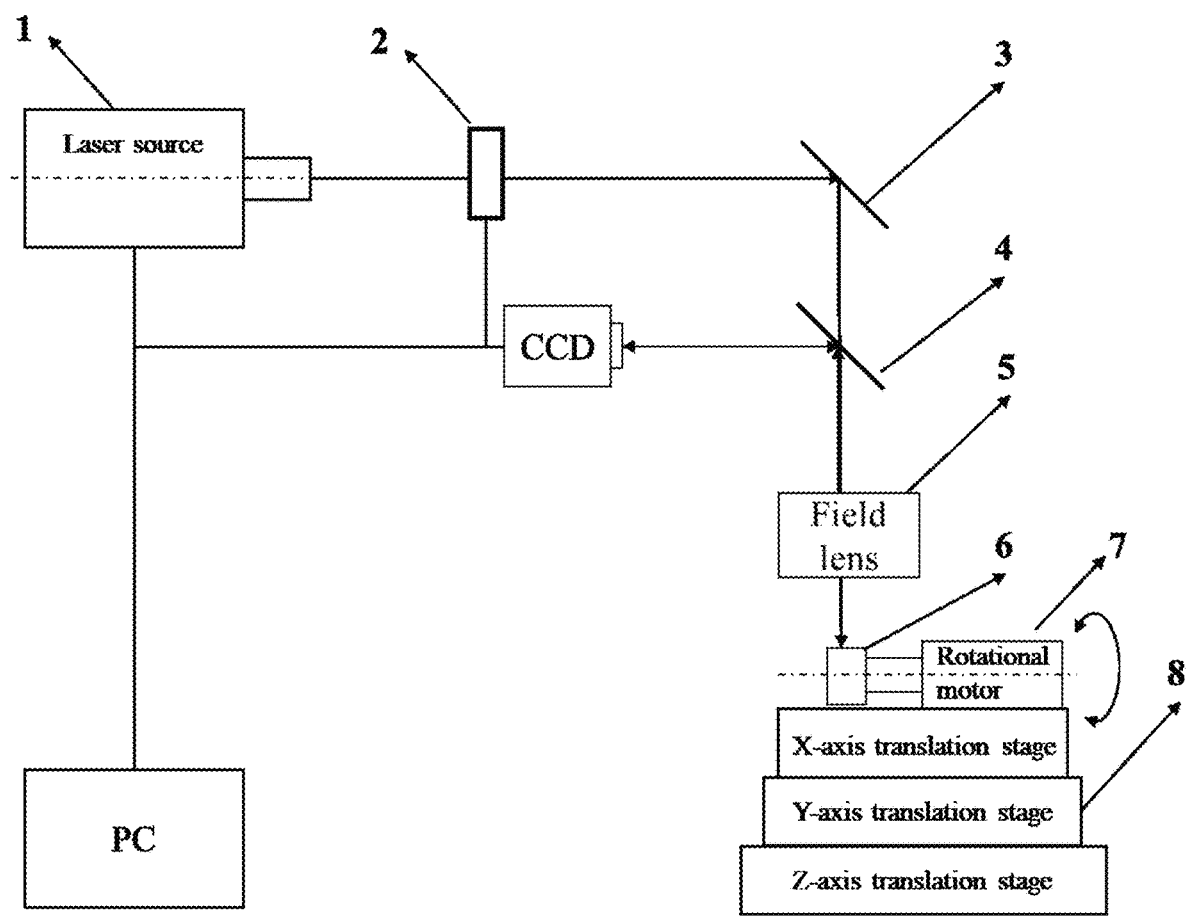
[FIG. 1]

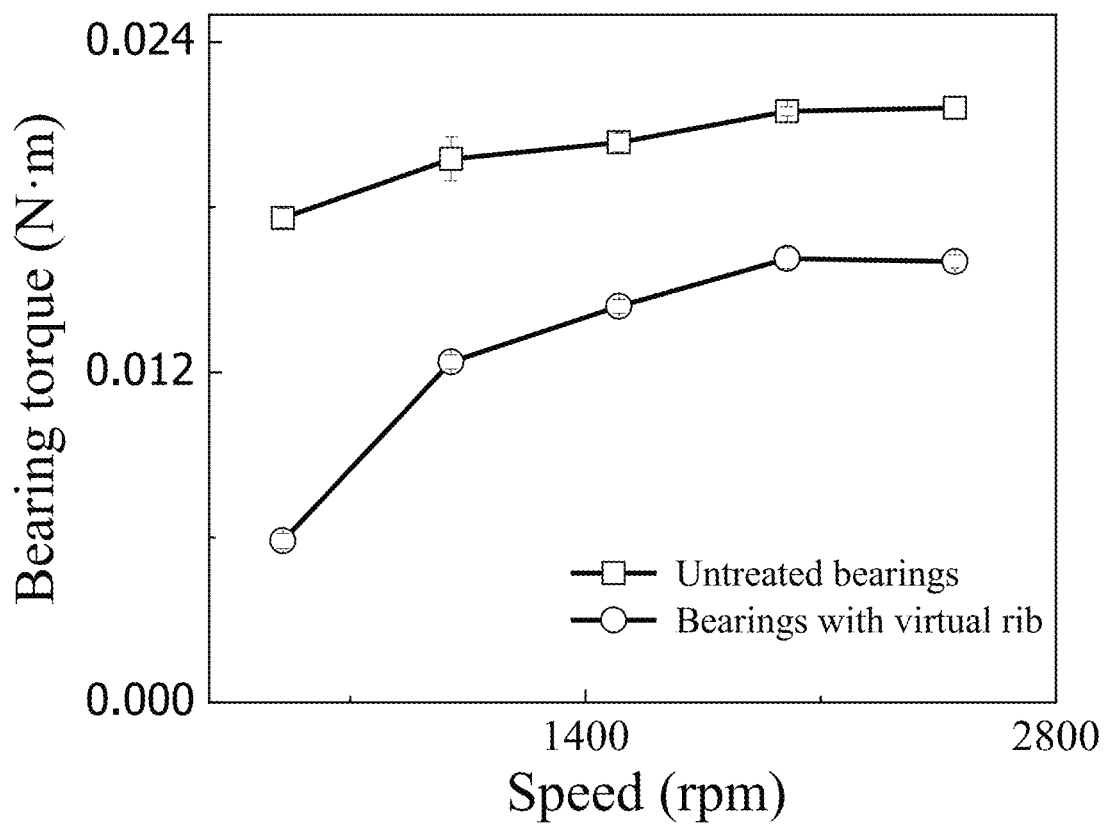
[FIG. 2]
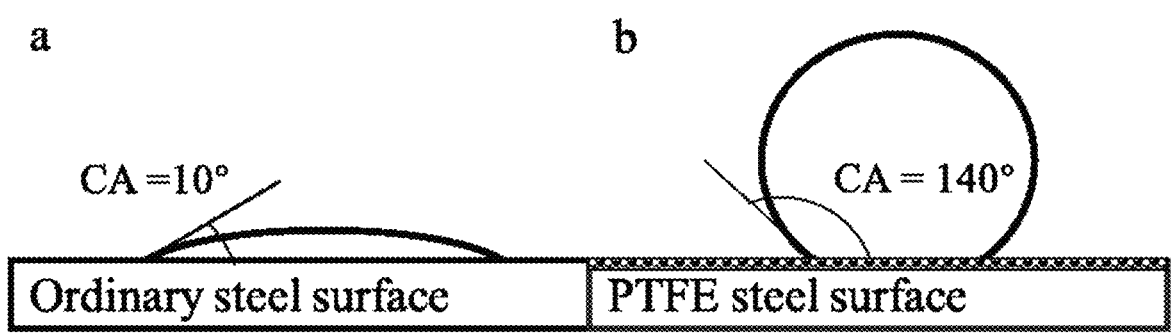
[FIG. 3]

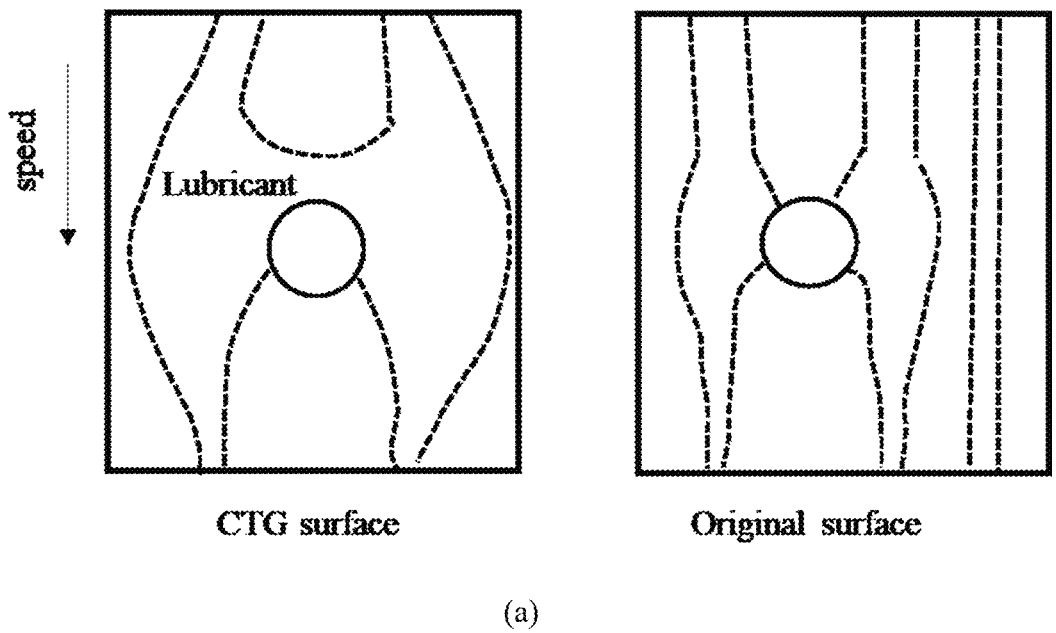
(a)
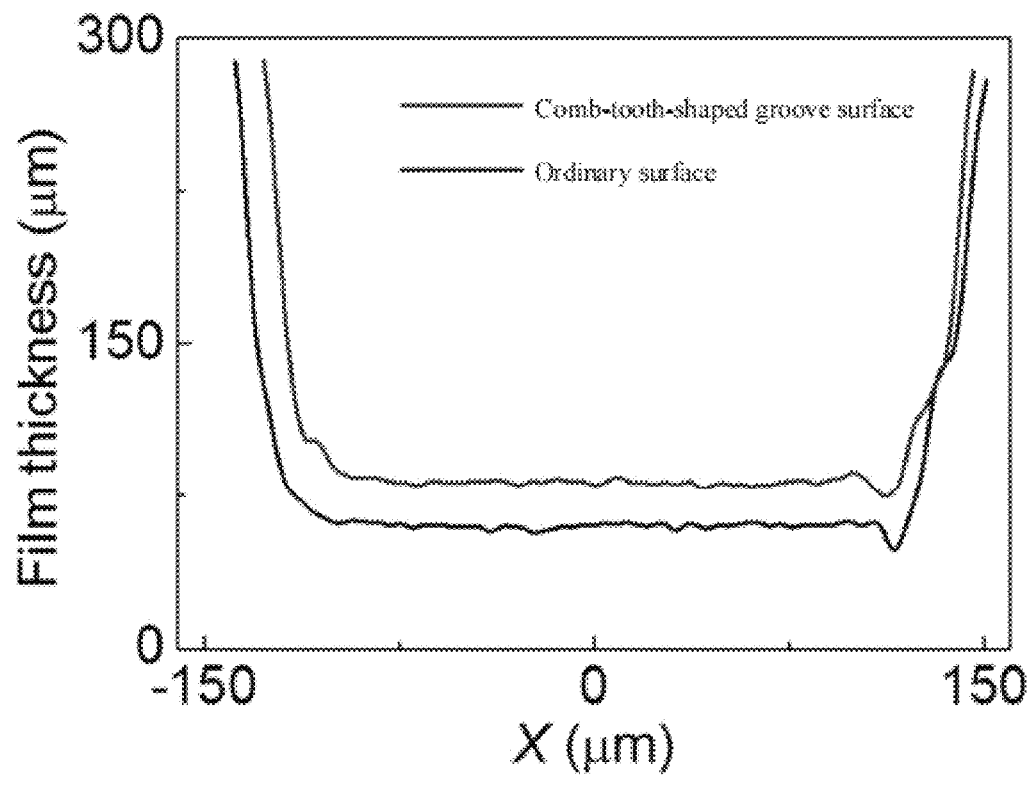
(b)
[FIG. 4]

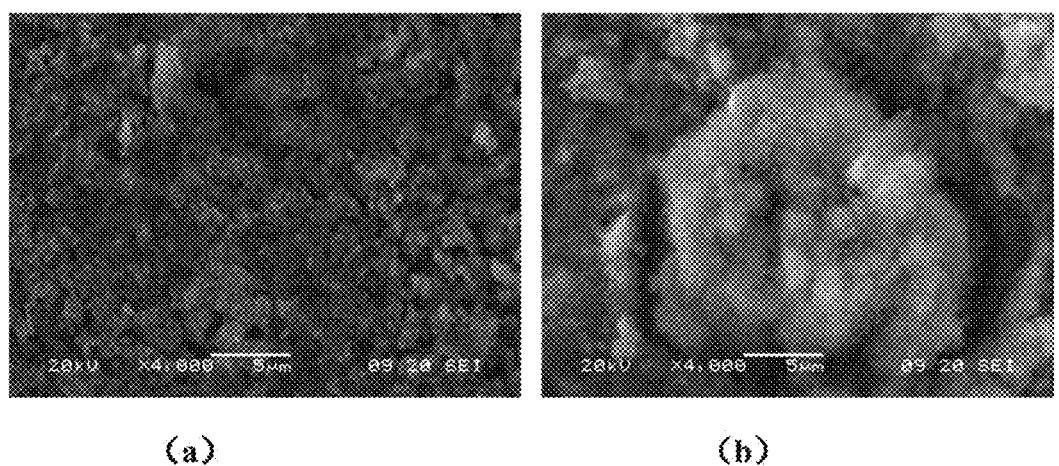
[FIG. 5]

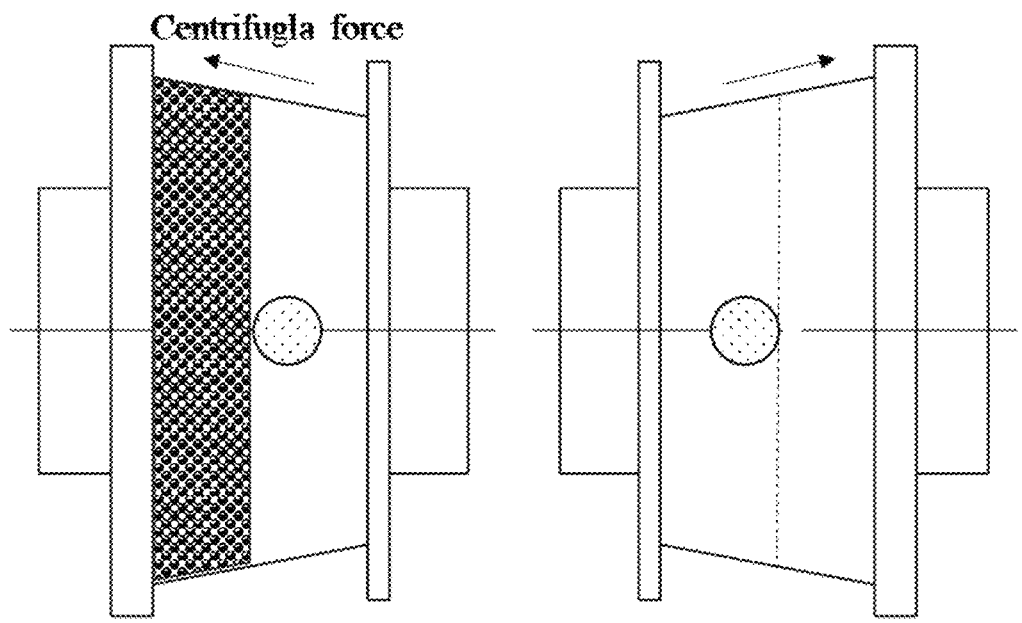
(a) Initial state of oil droplet
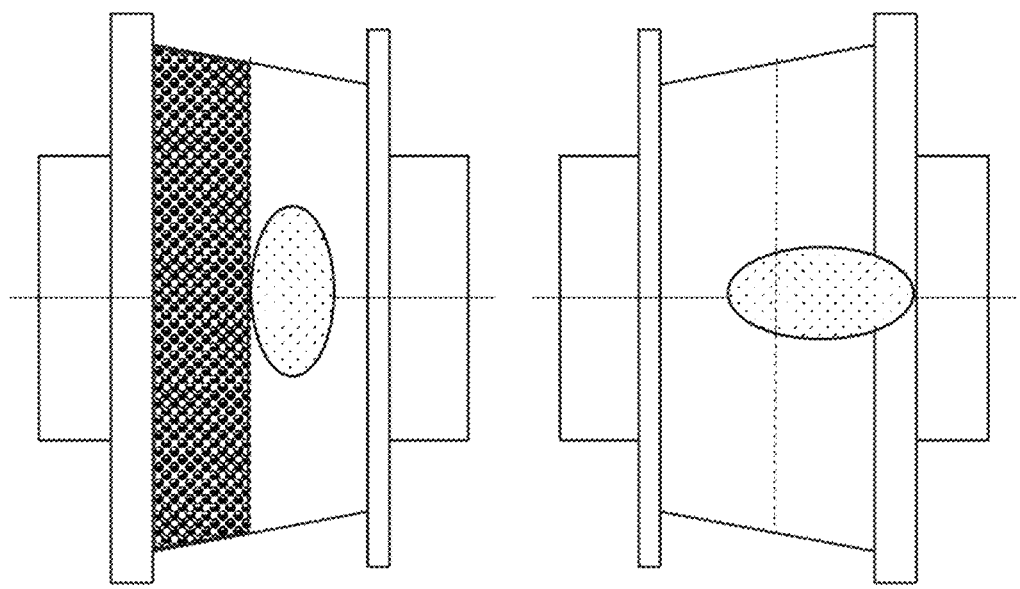
(b) Last state of oil droplet
[FIG. 6]

… (1)

THREE-DIMENSIONAL PARALLEL-TRIANGULAR-SHAPED GROOVE ARRAY SURFACE FOR BEARING AND FABRICATING METHOD THEREOF

FIELD OF THE INVENTION

The present invention belongs to the technical field of friction resistance and wear reduction of rolling bearings, and relates to a surface for realizing directional flow of a lubricant, enhancing lubrication and reducing bearing friction and a fabricating method thereof, and in particular to a three-dimensional comb-tooth-shaped groove array surface for a bearing on which lubricant replenishment enhancement is performed by using the three-dimensional comb-tooth-shaped groove array (3d-CTG) surface as a virtual rib and the effect of lubricant replenishment enhancement is achieved by the synergistic effect of the geometrical morphology of comb teeth and the wettability gradient of a chemical coating, and a fabricating method thereof.

BACKGROUND OF THE INVENTION

Bearings are known as mechanical joints. The maintenance of an effective lubricant film in a bearing can reduce friction and wear, but in practical work, excessive supply of a lubricant brings extra temperature rise of the bearing and waste of energy. When lubricant supply is reduced, most of the lubricant in a lubricating raceway is extruded and distributed on two sides of the lubricating raceway, and no effective lubrication supply is achieved. In high-speed operation, the lubricant may also be thrown out of the lubricating raceway due to centrifugal force and inertia force, such that two couple friction pair surfaces in rolling or sliding contact cannot be effectively separated. When the lubricant is supplied in a limited amount, thermal discoloration of the bearing, scratching of a large end of a roller and even locking of the whole roller are easily caused. Therefore, a control design of lubricant backfilling is required in the bearing to enhance backflow of the lubricant and prevent creeping, and to enhance the ability of the bearing to resist lubricant cut-off under limited supply of the lubricant. For example, a pattern wettability design on the surface of a bearing inner ring can not only effectively improve the backfilling effect of the lubricant, but also artificially control the distribution of the lubricant.

With the further improvement of surface engineering technology such as plating and coating, the control process of liquid lubricants on free surfaces is increasingly mature. However, effective ways to control lubricants still lack in tiny contact gaps of bearings, gears, etc. Although the lubricant supply can be effectively maintained by machining a flange, the lubricant can still be thrown away from a bearing raceway at a high speed. In unsealed or clearance fit sealed bearings, fresh lubricant needs to be continuously injected after the lubricant is thrown away. Extra lubricant injection devices bring burden to industrial design and production.

SUMMARY OF THE INVENTION

The objective of the present invention is to overcome the disadvantages of the prior art, and to provide a three-dimensional comb-tooth-shaped groove array surface for a bearing and a fabricating method thereof, where a virtual rib formed by a comb-tooth-shaped groove array acts on a self-lubricant-replenishment enhancement bearing to overcome the defect of lubricant cut-off between a rolling body and a contact surface due to centrifugal and creeping actions, and the distribution of a lubricant in the bearing is controlled to enhance the lubrication efficiency of the bearing under limited lubricant supply and prevent surface damage, such that a friction pair of contact parts can effectively use the lubricant replenishment ability of a lubricating raceway under limited lubricant supply, sufficient lubricant is obtained to achieve full film lubrication, finally an optimal tribological property is obtained, and the purposes of controllable lubrication process and improvement on lubricant use efficiency are achieved.

In order to achieve the above objective, the three-dimensional comb-tooth-shaped groove array surface for a bearing according to the present invention comprises a comb-tooth-shaped groove array and an oleophobic layer, the oleophobic layer is arranged on the surface of the comb-tooth-shaped groove array, each groove of the comb-tooth-shaped groove array is of a comb-tooth-shaped structure, the depth of the groove changes gradually from 0.2 to 2.5 μm from a tooth bottom to a tooth top, a single comb tooth has a tip angle of 30°, a length of 1 mm and a width of 150 μm, the oleophobic layer is a PTFE film with a thickness of 30 μm, and the contact angle of the PTFE film reaches 140°.

When the three-dimensional comb-tooth-shaped groove array surface for a bearing according to the present invention is applied to a bearing, the tips of the comb teeth point to the center of a bearing raceway and are distributed uniformly along the center of the bearing raceway.

The three-dimensional comb-tooth-shaped groove array surface of the present invention is fabricated by a femtosecond machining system, and the main structure of the femtosecond machining system comprises a femtosecond laser light source, a diaphragm, a reflector, a half-reflective half-transparent lens, an objective lens, a sample, a micro motor and a precision three-dimensional translation stage, where the sample is connected with the micro motor and placed on the precision three-dimensional translation stage, the precision three-dimensional translation stage controls the sample to move in three directions XYZ, and the objective lens is placed above the sample; the femtosecond laser light source, the diaphragm and the reflector are arranged on the same horizontal plane, the reflector is arranged above the objective lens, the half-reflective half-transparent lens is arranged between the reflector and the objective lens, an external charge coupled device (CCD) and the half-reflective half-transparent lens are on the same horizontal plane, and the CCD is connected with the femtosecond laser light source and the diaphragm respectively; and the femtosecond laser light source, the diaphragm, the precision three-dimensional translation stage and the CCD are connected with an external computer respectively.

The precision three-dimensional translation stage in the present invention has a movement accuracy of 0.1 mm.

The femtosecond laser light source in the present invention has a wavelength of 1040 nm, an average power of 40 W, and a single pulse laser energy of 50 μJ; and the femtosecond laser light source passes through the diaphragm, the reflector, the half-reflective half-transparent lens and the objective lens in turn to arrive at the sample, and the diameter of a light spot arriving at the sample is 10 μm.

The micro motor in the present invention rotates 5 degrees every 16 seconds, the sample is an inner ring of a rolling bearing, and the objective lens is an eight times objective lens.

When the three-dimensional comb-tooth-shaped groove array surface is fabricated on the inner ring of the rolling bearing, the surface of the bearing is first etched with grooves having a certain depth by means of femtosecond laser, then a PTFE film is impressed and attached to the surface of the inner ring of the bearing, the position of a laser focus is adjusted to focus on the lower surface of the PTFE film, the same pit is scanned repeatedly, ripple characteristic stripes occur on the surface of the inner ring of the bearing while the film gasifies instantly under the action of laser ablation heating, a part of polymer material in the gasified part is adsorbed to a mechanical surface in each pit under the action of mechanical interlocking, and a super-oleophobic PTFE surface is obtained in each groove. The specific process is as follows:

S1. Cleaning of bearing parts: selecting the inner ring of the rolling bearing as a sample, putting the surface of the inner ring of the rolling bearing into petroleum ether, absolute ethanol and deionized water in turn for ultrasonic cleaning for 10 minutes respectively, and then blow-drying the inner ring of the bearing with high-pressure nitrogen for later use;

S2. Pre-etching of a depth: assembling the sample cleaned in S1 with the micro motor and then installing the both on the precision three-dimensional translation stage, etching the same position with laser for 16 s, and then rotating a main shaft by 5 degrees, where the etching depth is selected between 0 and 5 μm according to the selected oleophobic material, and gasified metals and organic materials are cleared by using an exhaust system during fabrication to avoid material deposition;

S3. Film transfer preparing: selecting a PTFE film enough to cover the surface of the sample, filling the etched position of the bearing inner ring in S2 with a trace liquid resin adhesive, and tightly bonding the bearing inner ring fabricated in S2 with the PTFE film by using a vacuum degassing device; and S4. Film transfer fabricating: first putting the sample bonded with the film in S3 onto the precision three-dimensional translation stage, moving the focus of the laser to make the lower surface of the film and the steel surface clearly visible, repeating step S2 for etching treatment, and increasing the position of the laser focus by 10 μm after each of totally three scans, such that the surface of the inner ring of the rolling bearing is coated with a uniform and oleophobic PTFE film, where the average energy of a single scan is 10 μJ after attenuation, and the laser energy in this step varies according to the thickness of the film.

The present invention uses the comb-tooth-shaped groove array surface as a virtual rib of the inner ring of the rolling bearing to enhance control of lubricant flow, the comb-tooth-shaped groove array surface distributes comb-tooth-shaped groove array structures on two sides of the bearing raceway and at the same time endows the comb tooth region with oleophobic characteristics, and when lubricant cut-off occurs due to centrifugal action or creeping, the oleophobic part can effectively control the lubricant to prevent lubricant loss.

The present invention uses femtosecond laser to machine groove arrays on two sides of the inner ring raceway, and then uses the PTFE film for ablation, such that a layer of super-oleophobic PTFE coating is adsorbed to the surface of grooves with a contact angle of 140°, an oleophilic region that still keeps the original surface characteristics of the inner ring is formed without etching, and the contact angle of the oleophilic region is less than 10°, which can lock the lubricant and make the lubricant form a uniform lubricant film in the middle of the fabricated virtual rib; and the comb-tooth-shaped groove arrays increase the potential energy barrier of liquid lubricant expansion, the comb-tooth-shaped texture also increases the backfilling ability of the lubricant, and the surface of the PTFE film presents uneven cluster micro-nano structures after ablation, which can lock the lubricant and achieve an oleophobic effect.

The present invention uses a full bearing torque measuring instrument to measure bearing torque at different rotational speeds on the fabricated three-dimensional comb-tooth-shaped groove array surface, and uses a glass block sample to carry out lubricant film-forming experiments on a photo-elastohydrodynamic test machine, so as to test the film-forming properties of the sample with a virtual rib and an ordinary sample, where a reciprocating motion module with a stroke of 10 mm is used in the film-forming experiments, the lubricant is PAO4 with a dosage of 0.5 μL, the load is 30 N, and the speed range is 1-4 Hz; and in the film-forming experiments and torque measurement experiments, there is a limited lubricant in the friction pair, the lubricant is uniformly distributed in the oleophilic region, and when the friction pair moves relatively, the tension drives the lubricant on two sides to migrate to the central region of the lubricating raceway, the fabricated three-dimensional comb-tooth-shaped groove array surface inner ring enhances the migration of the lubricant to the central region of the lubricating raceway, and the lubricant resists the centrifugal force on two sides of the bearing lubricating raceway due to the driving force of the coating on two sides on the lubricant.

Compared with the prior art, the present invention has the following advantages and beneficial technical effects:

(1) The present invention can play a role of micro-nano groove arrays in guiding the transportation of a lubricant, improve the constraint distribution of the lubricant on a friction pair contacting parts, and also play a role of interface gradient force of the oleophobic coating to actively control lubricant loss;

(2) In the fabricated bearing with a virtual rib, the problems of lubricant shortage and difficult lubricant backflow in the bearing can be effectively solved. After the bearing with a virtual rib fabricated by the present invention is used, the film forming property of the lubricant material is increased, and the bearing torque is significantly reduced;

(3) The bearing with a three-dimensional comb-tooth-shaped groove array surface fabricated by the present invention can migrate the lubricant to the center of the lubricating raceway, and under the condition of limited lubricant supply, the bearing torque can maintain a low level, which greatly prolongs the service life of the bearing and greatly improves the operation performance of the bearing;

(4) The bearing with a three-dimensional comb-tooth-shaped groove array surface fabricated by the present invention can maintain a limited amount of lubricant between bearing lubricating raceways under the condition of discontinuous lubricant supply, and the oleophobic coatings on two sides of the bearing can reduce the agitation friction resistance of the lubricant and reduce the friction torque of the bearing.

BRIEF DESCRIPTION OF THE DRAWINGS

FIG. 1 is a structural schematic diagram of a femtosecond laser machining system according to the present invention.

FIG. 2 shows torque measurement results of a bearing with a three-dimensional comb-tooth-shaped groove array surface according to the present invention.

FIG. 3 is a diagram showing contact angle measurement results of different surfaces according to the present invention, where (a) is a contact angle of an ordinary steel surface, and (b) is a contact angle of a PTFE steel surface.

FIG. 4 is a comparison diagram of film thicknesses of 2 µL lubricant PAO4 on different surfaces under a load of 30 N according to the present invention, where (a) shows optical interference result diagrams, the left is an optical interference result about the film thickness of a three-dimensional comb-tooth-shaped groove array surface, and the right is an optical interference result about the film thickness of an ordinary surface; and (b) is a profile diagram of film thicknesses.

FIG. 5 shows electron microscope photographs of PTFE coatings on bearing steel surfaces according to the present invention, where (a) is a steel etched surface, and (b) is a PTFE oleophobic coating surface.

FIG. 6 shows experimental results of lubricant replenishment on inner ring surfaces of bearings according to the present invention, where (a) shows initial positions of lubricant droplets on the inner rings of the bearings (left: three-dimensional comb-tooth-shaped groove array surface; right: ordinary bearing), and (b) shows the distribution of lubricant droplets after the inner rings of the bearings rotate (left: three-dimensional comb-tooth-shaped groove array surface; right: ordinary bearing).

DETAILED DESCRIPTION OF THE EMBODIMENTS

Figure 7:
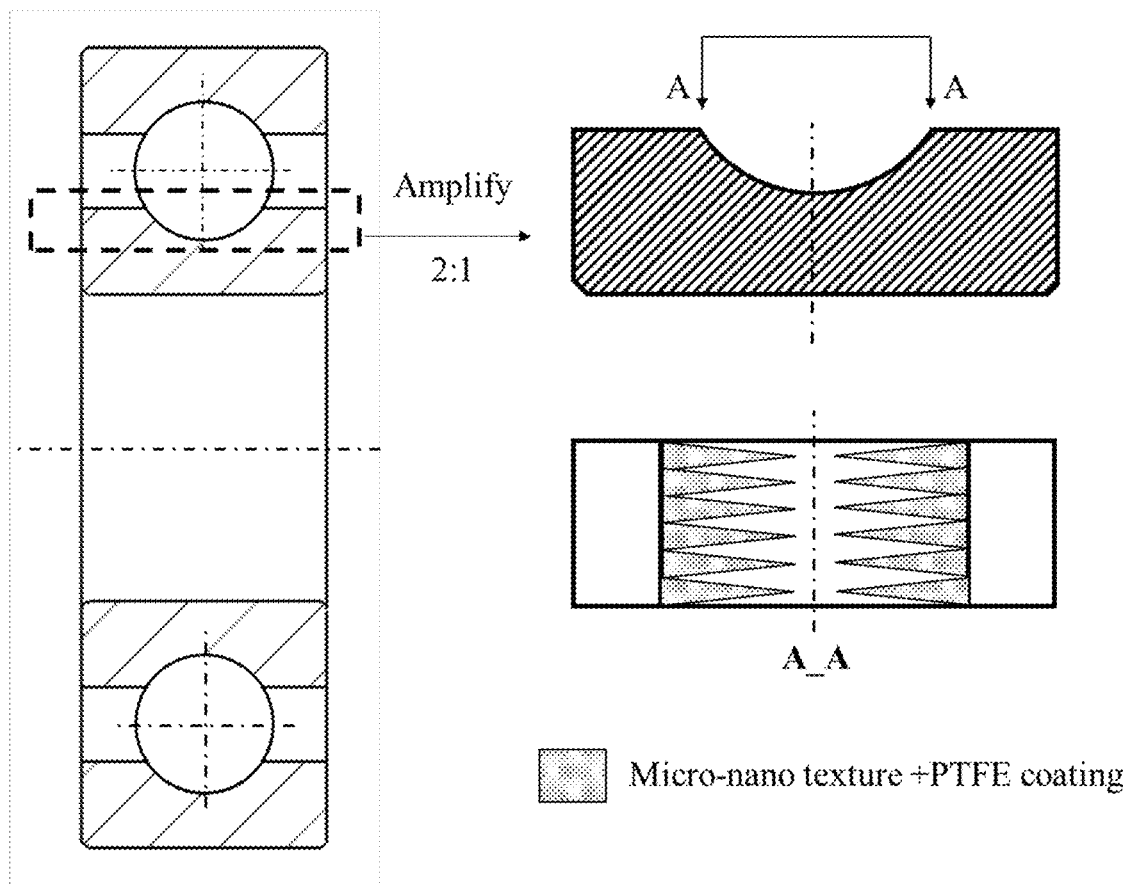
FIG. 7 is a structural diagram of a three-dimensional comb-tooth-shaped groove array surface according to the present invention.

The present invention will be further described in detail below with reference to the accompanying drawings and through embodiments.

Embodiment 1

A three-dimensional comb-tooth-shaped groove array surface for a bearing in this embodiment comprises a comb-tooth-shaped groove array and an oleophobic layer, the oleophobic layer is arranged on the surface of the comb-tooth-shaped groove array, each groove of the comb-tooth-shaped groove array is of a comb-tooth-shaped structure, the depth of the groove changes gradually from 0.2 to 2.5 µm from a tooth bottom to a tooth top, a single comb tooth has a tip angle of 30°, a length of 1 mm and a width of 150 µm, the oleophobic layer is a PTFE film with a thickness of 30 µm, and the contact angle of the PTFE film reaches 140°.

When the three-dimensional comb-tooth-shaped groove array surface for a bearing in this embodiment is applied to a bearing, the tips of the comb teeth point to the center of a bearing raceway and are distributed uniformly along the center of the bearing raceway.

The three-dimensional comb-tooth-shaped groove array surface in this embodiment is fabricated by a femtosecond laser machining system, and the main structure of the femtosecond laser machining system comprises a femtosecond laser light source 1, a diaphragm 2, a reflector 3, a half-reflective half-transparent lens 4, an objective lens 5, a sample 6, a micro motor 7 and a precision three-dimensional translation stage 8, where the sample 6 is connected with the micro motor 7 and placed on the precision three-dimensional translation stage 8, the precision three-dimensional translation stage 8 controls the sample 6 to move in three directions XYZ, and the objective lens 5 is placed above the sample 6; the femtosecond laser light source 1, the diaphragm 2 and the reflector 3 are arranged on the same horizontal plane, the reflector 3 is arranged above the objective lens 5, the half-reflective half-transparent lens 4 is arranged between the reflector 3 and the objective lens 5, an external CCD and the half-reflective half-transparent lens 4 are on the same horizontal plane, and the CCD is connected with the femtosecond laser light source 1 and the diaphragm 2 respectively; and the femtosecond laser light source 1, the diaphragm 2, the precision three-dimensional translation stage 8 and the CCD are connected with an external computer respectively.

The precision three-dimensional translation stage in this embodiment has a movement accuracy of 0.1 mm.

The femtosecond laser light source 1 in this embodiment has a wavelength of 1040 nm, an average power of 40 W, and a laser energy of 50 µJ; and the femtosecond laser light source 1 passes through the diaphragm 2, the reflector 3, the half-reflective half-transparent lens 4 and the objective lens 5 in turn to arrive at the sample 6, and the diameter of a light spot arriving at the sample 6 is 10 µm.

The micro motor 7 in this embodiment rotates 5 degrees every 16 seconds, the sample 6 is an inner ring of a rolling bearing, and the objective lens 5 is an eight times objective lens.

In this embodiment, a self-lubricant-replenishment bearing is fabricated (i.e., the three-dimensional comb-tooth-shaped groove array surface is fabricated in the inner ring of the rolling bearing) according to the following steps.

S1. Cleaning of bearing parts: the inner ring of the rolling bearing is selected as a sample 6, the surface of the inner ring of the rolling bearing is put into petroleum ether, absolute ethanol and deionized water in turn for ultrasonic cleaning for 10 minutes respectively, and then the inner ring of the bearing is blow-dried with high-pressure nitrogen for later use;

S2. Pre-etching of a depth: the sample 6 cleaned in S1 and the micro motor 7 are assembled and then installed on the precision three-dimensional translation stage 8, the same position is etched with laser for 16 s, and then a main shaft is rotated by 5 degrees, where the etching depth is selected between 0 and 5 µm according to the selected oleophobic material, and gasified metals and organic materials are cleared by using an exhaust system during fabrication to avoid material deposition;

S3. Film transfer preparing: a PTFE film enough to cover the surface of the sample is selected, the etched position of the bearing inner ring in S2 is filled with a trace liquid resin adhesive, and the bearing inner ring fabricated in S2 is tightly bonded with the PTFE film by using a vacuum degassing device;

S4. Film transfer fabricating: the sample bonded with the film in S3 is first put onto the precision three-dimensional translation stage 8, the focus of the laser is moved to make the lower surface of the film and the steel surface clearly visible, step S2 is repeated for etching treatment, and the position of the laser focus is increased by 10 µm after each of totally three scans, such that the surface of the inner ring of the rolling bearing is coated with a uniform and oleophobic PTFE film, where the average energy of a single scan is 10 µJ, and the laser energy in this step varies according to the thickness of the film material (the laser energy is 40 µJ); and the sample is taken out for property test;

S5. Oleophobic representing (use disc bearing steel of the same material): contact angles of an uncoated sample and the coated sample in S4 are measured with a contact angle measuring instrument, and static contact angles of the same volume of lubricant droplets on the surfaces of the disc samples are measured, where the amount of the lubricant is 5 μL, PAO4 base lubricant is selected as the lubricant to verify the oleophobic effect of the sample after coating, and the results are shown in FIG. 3;

S6. Bearing torque measurement: the bearing inner ring fabricated by S4 is combined with a bearing outer ring, a steel ball and a retainer, the torque of the combined bearing is measured, and the measured results of the combined bearing and an ordinary bearing are compared, where the results are shown in FIG. 2.

In this embodiment, when ablation spots on the surface of the sample 6 are observed with the CCD, the PTFE ablation surface has the best oleophobic effect.

The self-lubricant-replenishment bearing fabricated in this embodiment has a layer of comb-tooth-shaped micro-nano structure with certain roughness gradient and certain geometric morphology that is etched on the surface of the bearing inner ring; the PTFE oleophobic layer with excellent oleophobic property is ablated to the surface of the sample, such that the contact angle can have oleophobic property, and the contact angle of the oleophobic layer reaches 140°; the etched position is coated with trace resin adhesive, which is beneficial to the adhesion of PTFE; the same position is etched again with femtosecond laser, the PTFE film is gasified and adhered to the groove array position to fabricate a super-oleophobic and slip PTFE coating, the microstructure of the PTFE coating is shown in FIG. 5, the remaining raceway position is an oleophilic region of an ordinary steel surface, and the oleophilic region can lock the lubricant and make the lubricant continuously distributed in the fabricated oleophilic raceway, while the oleophobic coatings on two sides can well limit the expansion of the lubricant to the two sides; and the tooth tips of the comb-tooth-shaped micro-nano structure face the center of the bearing raceway, and the roughness increases gradually from tooth tips to tooth roots, such that the oleophobic coatings have better bonding ability, and the comb-tooth-shaped micro-nano structure achieves the effect of transporting the lubricant distributed thereon to the center of the raceway.

Embodiment 2

In this embodiment, the self-lubricant-replenishment bearing fabricated in Embodiment 1 is subjected to bearing torque experiments and lubrication film-forming test experiments by using a bearing torque tester and a photo-elastohydrodynamic lubricant film measurement tester respectively. The test results of the self-lubricant-replenishment bearing and an untreated bearing are compared. The lubricant for film-forming experiments is PAO4 with a dosage of 0.5 μL, the load is 30 N, the speed range is 0-80 mm/s, and the test samples are glass blocks with the same texture and PTFE coating. The bearing torque measurement experiments are carried out on a bearing torque testbed, the load used is 280 N, the speed range is 500-2500 rpm, and the lubricant is PAO4 with a dosage of 5 μL. The microstructure of the surface of the fabricated bearing steel sample 6 is observed with a scanning electron microscope, as shown in FIG. 5. It can be seen from FIG. 5 that the originally smooth PTFE surface presents a tiny cluster structure after etching, and the microstructure changes obviously, showing a nano-scale layered distribution structure, which is a typical hydrophobic and oleophobic structure. The lubricant replenishment effect of the bearing inner ring is tested: 0.5 μL of PAO4 lubricant is dripped to the boundary of a coating, centrifugal test is carried out at a rotational speed of 1000 rpm, and the distribution of lubricant droplets on the surface of the bearing inner ring before and after the experiment is shown in FIG. 6, showing the lubricant replenishment property of the fabricated virtual rib (i.e., the three-dimensional comb-tooth-shaped groove array surface), where the nano-structure in the oleophobic region at the boundary between the oleophilic region and the oleophobic region inhibits the flow of the lubricant in the oleophilic region and can effectively prevent the lubricant from creeping. In the film-forming experiments and friction and wear experiments, there is a limited lubricant in the friction pair, the lubricant is uniformly distributed in the oleophilic region, and when the friction pair moves relatively, the tension drives the lubricant on two sides to migrate to the central region of the lubricating raceway, the virtual rib in the fabricated self-lubricant-replenishment bearing enhances the migration of the lubricant to the central region of the lubricating raceway, and the lubricant can spontaneously maintain a relatively large lubricant pool on two sides of the raceway and resist the inertia force including centrifugal force due to the transport characteristics of the comb-tooth-shaped micro-nano structure.

The torque test results of the bearings in this embodiment are shown in FIG. 2. Under the condition of the same lubricant supply and the same load, the virtual rib on the inner ring surface of the self-lubricant-replenishment bearing can maintain a certain film thickness, but the bearing torque on the surface of the ordinary lubricating raceway is larger under the existing speed condition. It can also be seen from the film thickness profile of FIG. 4 that the surface with comb-tooth-shaped grooves can maintain a higher film thickness than the ordinary surface. It can also be seen from FIG. 2 that, in the low speed segment of 500 rpm, the torque difference between the two types of bearings is large and is 0.011 Nm, and with the increase of speed, the difference between them is small, but at 2000-2500 rpm, the difference between them gradually stabilizes and reaches 0.005 Nm. According to the results of film thickness experiments in FIG. 4, the distribution of a lubricant pool in the ordinary raceway is small, showing that the lubricating effect of the patterned wetting raceway is better than that of the ordinary raceway; the lubricant replenishment effect of the improved lubricating raceway is obviously enhanced; even if a small amount of lubricant is used, a good lubricant supply effect can also be achieved; and for PAO4 base lubricant with low viscosity in industrial application, the film thickness difference in the center of the contact region can reach 22 nm at the speed of 80 mm/s.

The invention claimed is:

1. A three-dimensional parallel-triangular-shaped groove array for a bearing, comprising
a parallel-triangular-shaped groove array and
an oleophobic layer, and
an oleophilic region
wherein the oleophobic layer is arranged on a surface of the parallel-triangular-shaped groove array, each groove of the parallel-triangular-shaped groove array is of a parallel-triangular-shaped structure, a depth of the groove changes from 0.2 to 2.5 μm from a tooth bottom to a tooth top, a single comb tooth has a tip angle of 30°, a length of 1 mm and a width of 150 μm, the oleophobic layer is a PTFE film with a thickness of 30 μm.

2. A femtosecond machining system for fabricating the three-dimensional parallel-triangular-shaped groove array for a bearing according to claim 1, wherein the femtosecond machining system comprises a femtosecond laser light source, a diaphragm, a reflector, a half-reflective half-transparent lens, an objective lens, a sample, a micro motor and a precision three-dimensional translation stage, where the sample is connected with the micro motor and placed on the precision three-dimensional translation stage, the precision three-dimensional translation stage controls the sample to move in three directions XYZ, and the objective lens is placed above the sample; the femtosecond laser light source, the diaphragm and the reflector are arranged on the same horizontal plane, the reflector is arranged above the objective lens, the half-reflective half-transparent lens is arranged between the reflector and the objective lens, an external charge coupled device (CCD) and the half-reflective half-transparent lens are on the same horizontal plane, and the CCD is connected with the femtosecond laser light source and the diaphragm respectively; and the femtosecond laser light source, the diaphragm, the precision three-dimensional translation stage and the CCD are connected with an external computer respectively.

3. The femtosecond machining system for fabricating the three-dimensional parallel-triangular-shaped groove array for a bearing according to claim 2, wherein the precision three-dimensional translation stage has a movement accuracy of 0.1 mm.

4. The femtosecond machining system for fabricating the three-dimensional parallel-triangular-shaped groove array for a bearing according to claim 2, wherein the femtosecond laser light source has a wavelength of 1040 nm, an average power of 40 W, and a laser single pulse energy of 50 µJ; and the femtosecond laser light source passes through the diaphragm, the reflector, the half-reflective half-transparent lens and the objective lens in turn to arrive at the sample, and the diameter of a light spot arriving at the sample is 10 µm.

5. The femtosecond machining system for fabricating the three-dimensional parallel-triangular-shaped groove array for a bearing according to claim 2, wherein the micro motor rotates 5 degrees every 16 seconds, the sample is an inner ring of a rolling bearing, and the objective lens is an eight times objective lens.

6. A method for fabricating the three-dimensional parallel-triangular-shaped groove array for a bearing according to claim 2, wherein the method comprising the steps of:
(i) selecting the inner ring of the rolling bearing as a sample, putting the surface of the inner ring of the rolling bearing into petroleum ether, absolute ethanol and deionized water in turn for ultrasonic cleaning for 10 minutes respectively, and then blow-drying the inner ring of the bearing with high-pressure nitrogen for later use;
(ii) assembling the sample cleaned in (i) with the micro motor and then installing the both on the precision three-dimensional translation stage, etching the same position with laser for 16 s, and then rotating a main shaft by 5 degrees, wherein the etching depth is selected between 0 and 5 µm according to the selected oleophobic material, and gasified metals and organic materials are cleared by using an exhaust system during fabrication to avoid material deposition;
(iii) selecting a PTFE film enough to cover the surface of the sample, filling the etched position of the bearing inner ring of (ii) with a trace liquid resin adhesive, and tightly bonding the bearing inner ring fabricated in (ii) with the PTFE film by using a vacuum degassing device; and
(iv) first putting the sample bonded with the film in (iii) onto the precision three-dimensional translation stage, moving the focus of the laser to make the lower surface of the film and the steel surface clearly visible, repeating step (ii) for etching treatment, and increasing the position of the laser focus by 10 µm after each of totally three scans, such that the surface of the inner ring of the rolling bearing is coated with a uniform and oleophobic PTFE film, wherein the average energy of a single scan is 10 µJ after attenuation.

7. A bearing with a three-dimensional parallel-triangular-shaped groove array comprising, a parallel-triangular groove array and
an oleophobic layer, and
an oleophilic region
wherein the oleophobic layer is arranged on a surface of the parallel-triangular-shaped groove array, each groove of the parallel-triangular-shaped groove array is of a parallel-triangular-shaped structure, a depth of the groove changes from 0.2 to 2.5 µm from a tooth bottom to a tooth top, a single comb tooth has a tip angle of 30°, a length of 1 mm and a width of 150 µm, the oleophobic layer is a PTFE film with a thickness of 30 µm;
wherein when the surface is applied to at least one bearing, tips of the parallel triangular point to a center of a bearing raceway and are distributed uniformly along a center of the bearing raceway.

* * * * *